United States Patent [19]
Lievens et al.

[11] 3,969,805
[45] July 20, 1976

[54] METHOD OF CONSTRUCTING AN AXIAL FLOW FAN

[75] Inventors: Ronald J. Lievens, Onalaska; Richard W. Kabat, Genoa, both of Wis.

[73] Assignee: The Trane Company, La Crosse, Wis.

[22] Filed: Dec. 23, 1974

[21] Appl. No.: 535,431

[52] U.S. Cl. .............................. 29/156.8 R; 29/446; 29/455 R; 415/217; 416/189
[51] Int. Cl.² ..................... B23P 15/04; B23P 11/02
[58] Field of Search ............... 29/156.8 R, 446, 455, 29/157.3 A; 415/209, 210, 217, 216; 416/189, 214

[56] References Cited
UNITED STATES PATENTS

| | | | |
|---|---|---|---|
| 1,269,144 | 6/1918 | Williamson | 29/156.8 R |
| 3,156,970 | 11/1964 | Zojac | 416/189 |
| 3,158,122 | 11/1964 | De Give | 29/157.3 A |
| 3,848,518 | 11/1974 | Martin | 92/107 |
| 3,887,976 | 6/1975 | Shields et al. | 29/156.8 R |

FOREIGN PATENTS OR APPLICATIONS

| | | | |
|---|---|---|---|
| 909,058 | 10/1962 | United Kingdom | 29/156.8 R |

*Primary Examiner*—C.W. Lanham
*Assistant Examiner*—Dan C. Crane

[57] ABSTRACT

A vane axial flow fan is shown having a shroud construction which provides greater than normal rigidity in the areas co-extensive with the stator vanes and fan wheel blades. Further, a novel method of constructing an axial flow fan is disclosed wherein the stator vanes are first mounted on an expandable split ring which is then placed within an annular stator housing. The split ring is then expanded to reduce stator vane end clearance prior to being permanently secured in place by welding.

7 Claims, 15 Drawing Figures

METHOD OF CONSTRUCTING AN AXIAL FLOW FAN

This invention relates to a method of constructing an axial flow fan having a stator vane section. More specifically it relates to a series of steps for constructing the stator vane portion of an axial flow fan equipped with stator vanes. Still more specifically this invention pertains to a method of reducing stator vane end clearance in the construction of an axial flow fan to prevent aerodynamic turbulence and to permit a stronger and more uniform welded bond for the stator vanes. This is accomplished by a unique sequence of fan construction steps including the step of expanding the vane carrying core prior to permanently securing the radially outer ends of the vanes to the fan shroud housing. More specifically this invention involves a method of constructing an axial flow fan including the steps of: providing a generally circular split ring stator core; providing a plurality of stator vanes; positioning said stator vanes in radially outward extending positions at circumferentially spaced locations about said split ring stator core; securing said vanes at one end to said split ring stator core to form a stator core-vane assembly; providing a generally circular annular fan shroud housing; decreasing the radius of curvature of said split ring stator core sufficiently to permit said split ring stator core-vane assembly to be passed into axially co-extensive relationship within said fan shroud housing; passing said split ring stator core-vane assembly into axially co-extensive relationship within said fan shroud housing; subsequent to said passing step, reducing the clearance between the radially outward end of said vanes and said fan shroud housing by expanding said split ring stator core; securing said split ring stator core in said expanded position; and securing the radial outer ends of said vanes to said fan shroud housing.

These and other objects of the invention will become more apparent as this specification proceeds to describe the invention with reference to the drawings in which.

Figure 4:
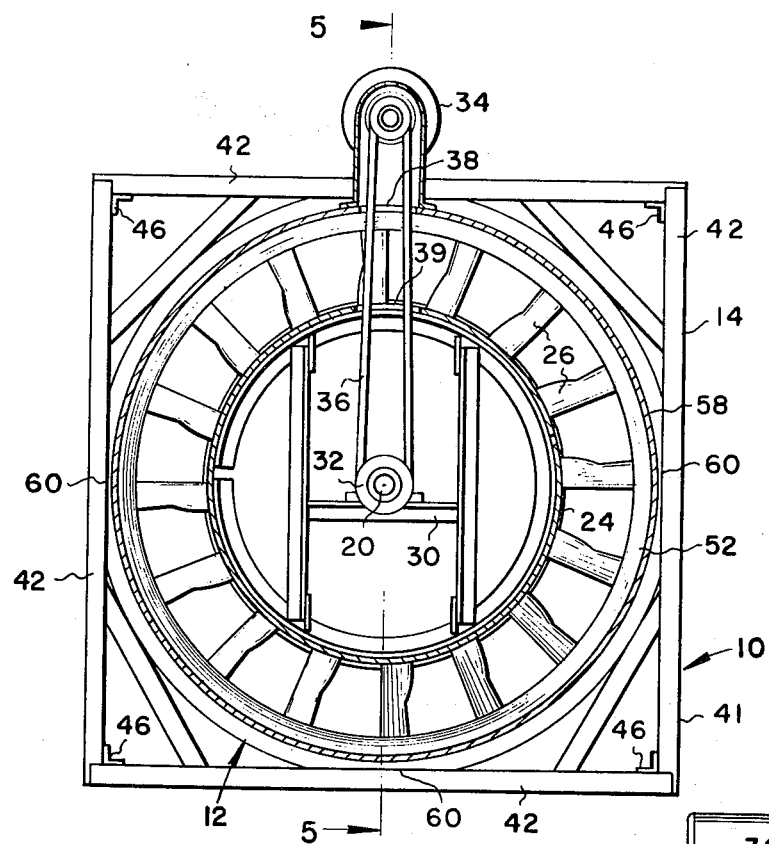
FIG. 4 is a vertical sectional view taken near the outlet end of the fan at line 4—4 of FIG. 3.
Figure 1:
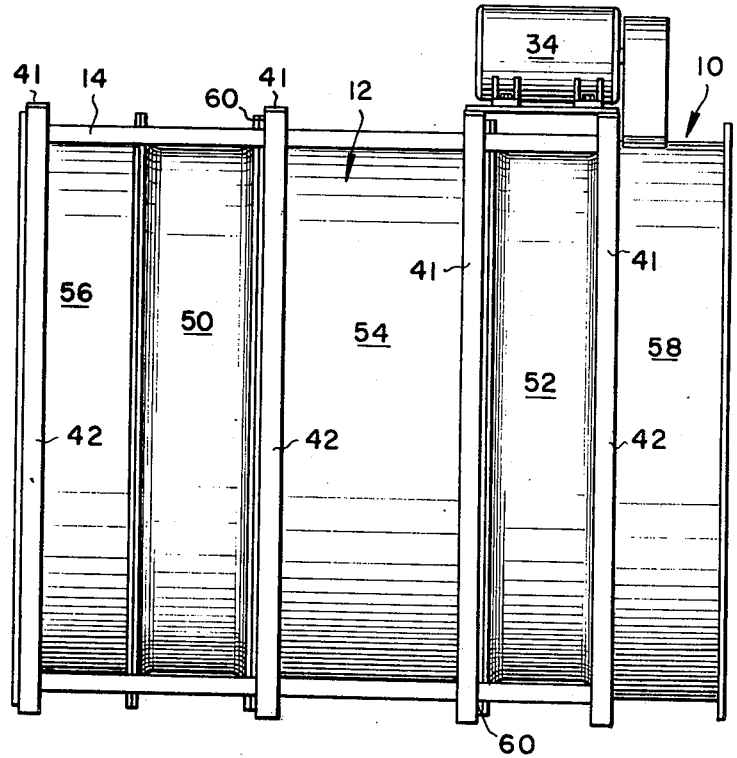
FIG. 1 is a side elevation of an axial flow fan containing the invention herein described.
Figure 5:
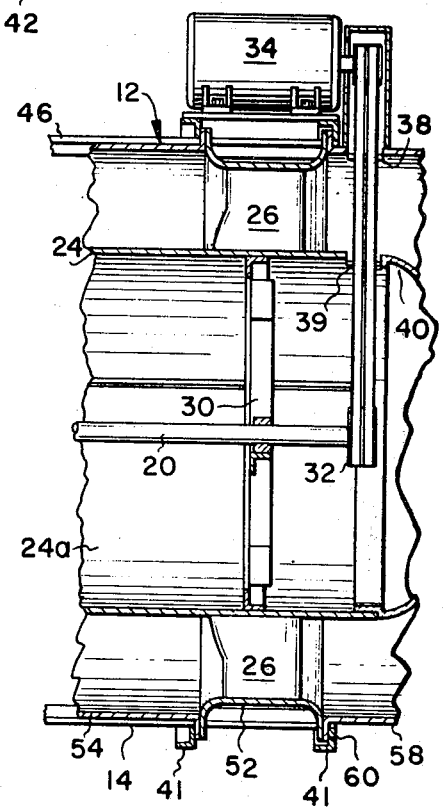
FIG. 5 is a vertical section taken substantially through the center of the stator vane portion of the fan showing the bearing support and drive mechanism.
Figure 2:
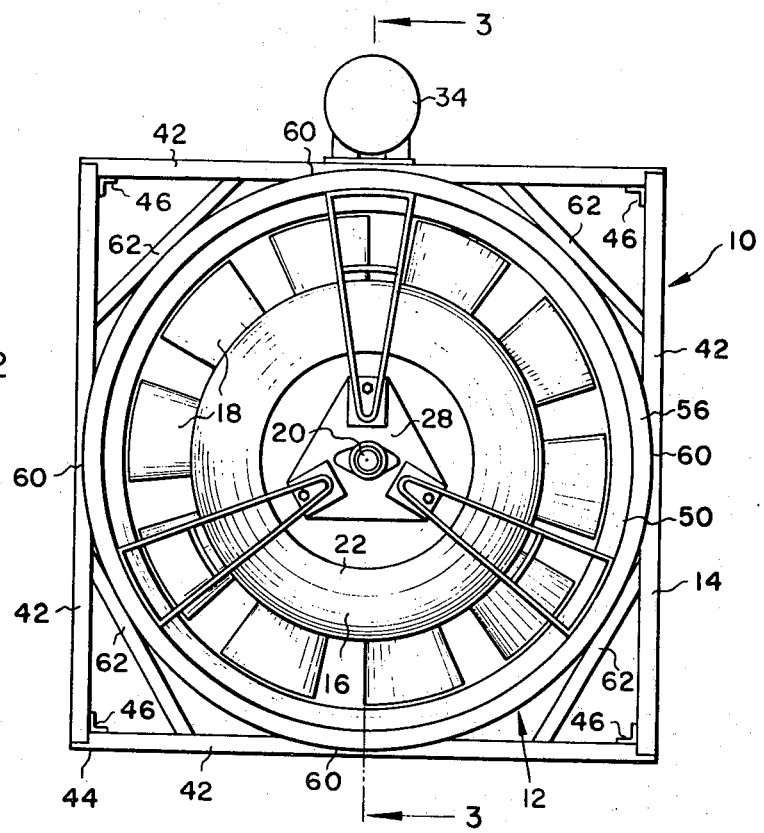
FIG. 2 is an end elevation showing the inlet end of the fan shown in FIG. 1.
Figure 14:
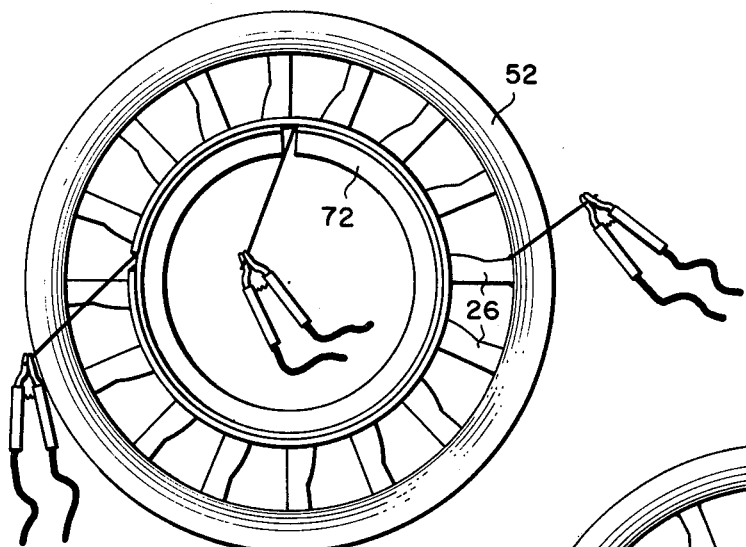
Figure 15:
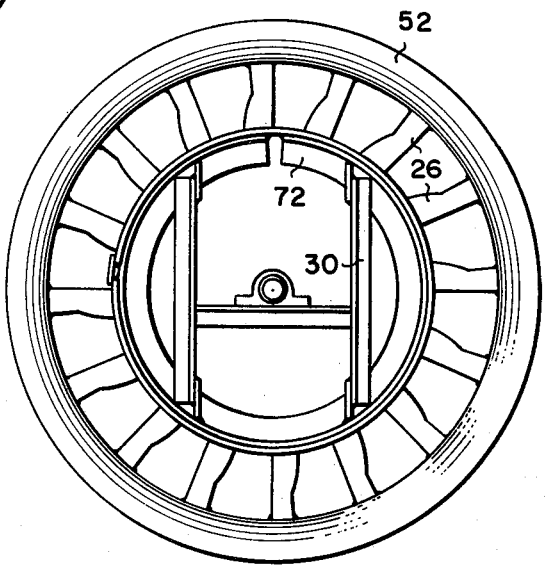

FIG. 14 is an end elevation similar to FIG. 1 illustrating the step of further expanding the first split ring by removing the constraining forces from the partially collapsed second split ring, and FIG. 15 is a view similar to FIG. 15 illustrating the step of welding the stator vanes permanently to the first split ring and the annular channel member of the housing shroud and the step of fastening a bearing bracket to the second split ring.

Now with reference to the drawings it will be seen that the axial flow fan 10 includes a fan shroud or housing 12 disposed within a cage 14 constructed of angle iron bars.

A fan wheel 16 is mounted with the fan shroud 12 near the inlet end thereof. Fan wheel 16 is provided with a plurality of circumferentially spaced radially outwardly extending airfoil blades 18. Fan wheel 16 is fixedly mounted on shaft 20 for rotation therewith. The fan wheel 16 is further provided with a rounded nose piece 22 for efficiently directing air or other fluid to the fan blades.

A stator core 24 of generally circular cylindrical configuration is disposed immediately downstream of fan wheel 16. At the downstream portion of the stator core there is provided a plurality of circumferentially spaced stator vanes 26 which extend radially outwardly from stator core 24 to the shroud 12. The vanes 26 are welded at each end whereby the stator core is supported by shroud member 12.

Shaft 20 extends from the inlet end of shroud 12 to a point rearwardly of i.e., downstream of stator vanes 26. The forward end of shaft 20 is rotatably supported by way of a forward bearing bracket 28 which is preferably constructed in accordance with the teachings of U.S. Pat. No. 3,403,843. The rear portion of shaft 20 is rotatably mounted within a bearing supported by a rear bearing bracket 30 rigidly connected to the interior of stator core 24. The rear end of shaft 20 is provided with a sheave 32 drivingly connected to motor 34 via belts 36 which extend through an openings 38 in shroud 12 and 39 in stator core 24. The downstream side of stator core 24 is preferably closed by way of an end bell 40. Motor 34 is preferably mounted on cage 14.

Cage 14 is constructed of several square frames 41 each having four tangentially arranged angle bars 42 connected to each other at their ends as at 44. The several frames are interconnected by a longitudinally extending angle bar 46 passing just inside each corner of the square frame. Connections are preferably made by welding. The tangentially extending bars 42 and axially extending bars 46 provide a support cage for shroud 12 as will be hereinafter described.

Figure 3:
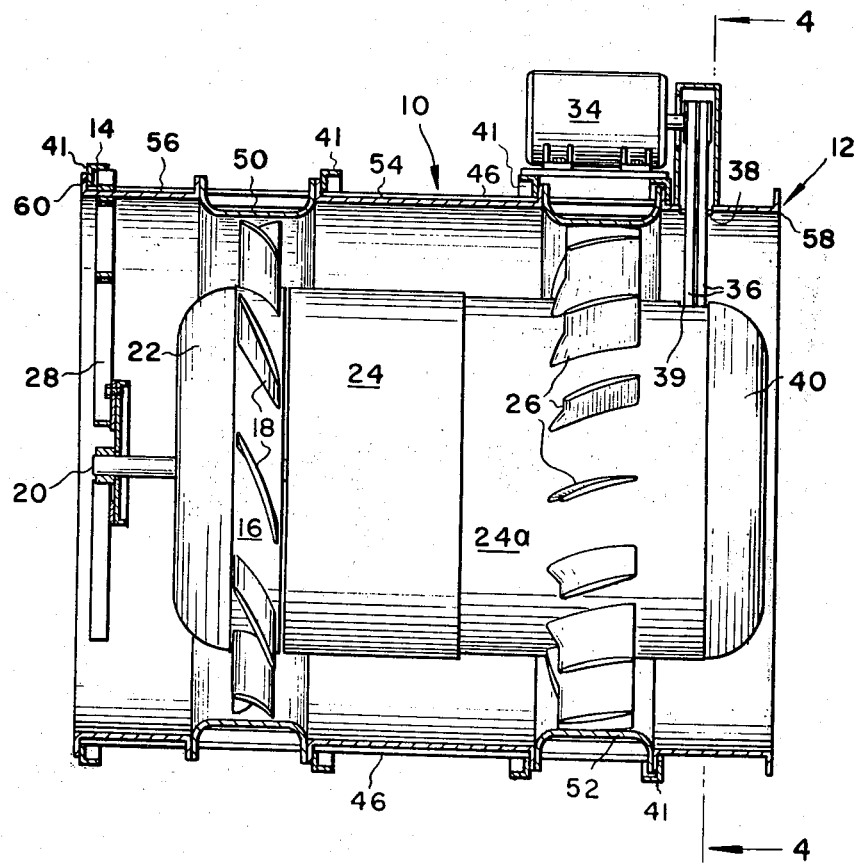
FIG. 3 is a vertical sectional view taken along line 3—3 of FIG. 2.

Shroud 12 is comprised of five annular channel members of U-shaped cross section each having a cylindrical substantially circular web disposed intermediate radially outwardly extending flanges. A first annular channel member 50 is disposed primarily in the vicinity of the fan wheel 16 and is axially co-extensive therewith. A second annular channel member 52 is disposed primarily in the vicinity of stator vanes 26 in axially co-extensive relationship therewith. A third annular channel member 54 bridges between channel members 50 and 52. A fourth annular channel member 56 extends forwardly or upstream of annular channel member 50 and the fifth annular channel member 58 extends rearwardly or downstream of annular channel member 52. The flanges of all of the channel members 50, 52, 54, 56, and 58 all have substantially the same outer diameter. However, the flanges of annular channel members 50 and 52 are substantially deeper than those of channel members 54, 56, and 58. The webs of channel members 50 and 52 are of equal diameter and of substantially less diameter than the webs of channel members 54, 56, and 58. In the embodiment shown the webs of channel members 54, 56, and 58 are of equal diameter. Furthermore, it will be noted that the transition portion of the flanges on channel members 50 and 52 have a very large radius of curvature as seen in FIG. 3 so as to avoid excessive turbulence within the shroud 12. The increased depth of the channel of each of members 50 and 52 thus provides a relatively greater rigidity in critical areas of the fan. The radius of curvature of a transition areas of channel members 50 and 52 is between 0.01 and 0.1 times the diameter of the web portion thereof. The radius of curvature of the transition area of the flanges of channel member 54 are less than 0.01 times the diameter of the web thereof.

In order to achieve this unique channel configuration and relationship, it is preferred to form channel members 54, 56, and 58 by roll forming at low cost and to form channel members 50 and 52 by spinning whereby transition areas of sufficiently large radius of curvature may be formed.

The fan shroud is supported with and by cage 14 heretofore described. The plane of each frame 41 of the four tangentially extending angle bars 42 is positioned adjacent and welded as at 60 directly to flanges of the U-shaped channel members. In the embodiment shown having five support frames, the shroud 12 may be supported at sixteen spaced points by cage 14. If corner braces 62 are employed on each frame, the number of support points can be doubled.

It will thus be seen that relative shape and position of U-shaped channel members 50, 52, 54, 56, and 58 disposed within, and supported at multiple spaced points provides an unusually strong and light fan construction. The substantially more rigid member 50 permits closer blade tip clearance while the substantially more rigid member 52 provides ample support for the rear bearing through the stator core and vanes. The large radius on the flanges of members 50 and 52 efficiently direct the fluid flow to and from the fan blades and stator vanes.

Having now described the detail construction and general method of forming the fan, particular attention is given to the unique method of forming the stator vane section as a unitary assembly. This assembly includes the rear portion of the stator core 24 in the form of a split ring 24a, stator vanes 26, annular channel member 52 serving as the stator portion of the fan shroud or housing, and the bearing bracket 30 including a second split ring 72.

This method of forming the unitary stator assembly is illustrated in FIGS. 6–15.

Figure 6:
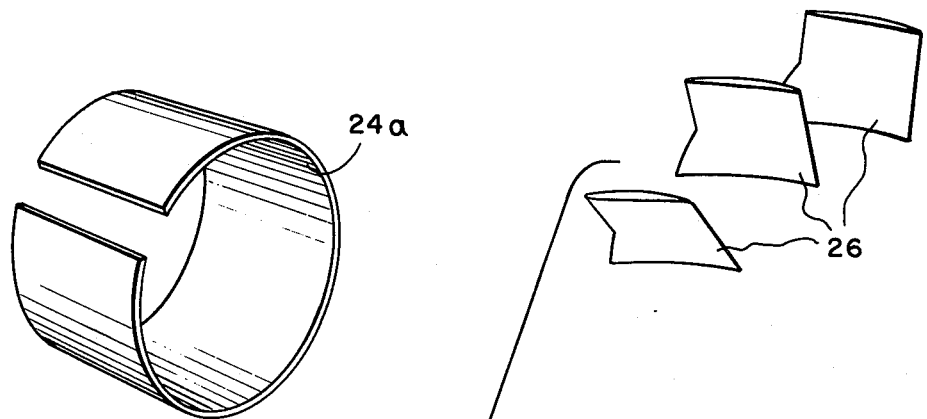
FIG. 6 is a perspective of a split ring stator core prior to assembly.
Figure 7:
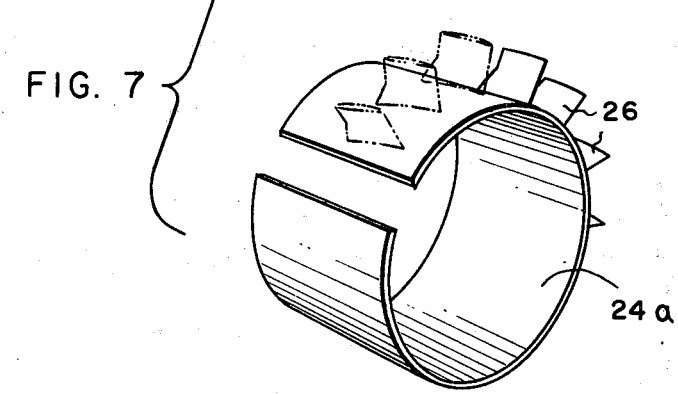
FIG. 7 is a perspective illustrating the step of positioning the stator vanes on the split ring stator core members of FIG. 6.

This method includes first providing a cylindrical split ring 24a as seen in FIG. 6 and a plurality of stator vanes 26. The stator vanes 26 are positioned about the exterior of split ring 26 in circumferentially spaced relations. A spacing jig (not shown) may be used to obtain the desired spacing. In the alternative various locator marks may be used such as holes, tabs, or mere indicia. In this position the vanes 26 are preferably lightly welded at their root end to the split 24a as shown in FIG. 7. If tabs are used as locators, welding at this step may not be necessary.

Figure 8:
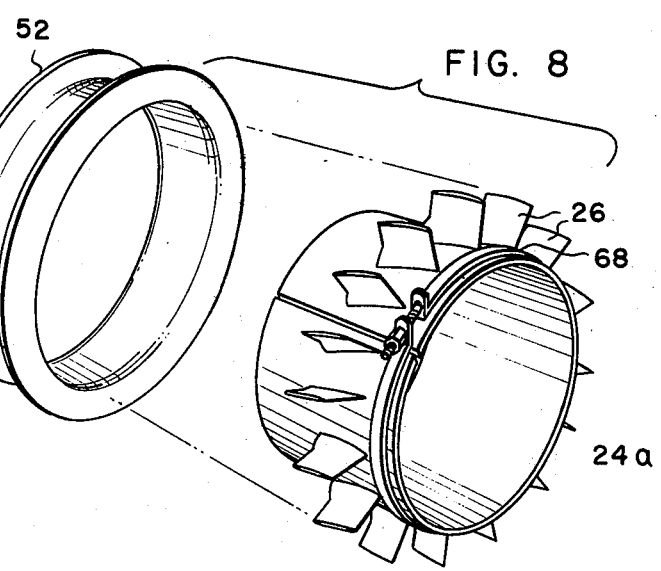
FIG. 8 is a perspective illustration of the steps decreasing the radius of curvature and thereby reducing the diameter of the split ring stator core member with stator vanes attached ready to be axially moved within the annular channel member 52 of the fan shroud or housing 12.
Figure 9:
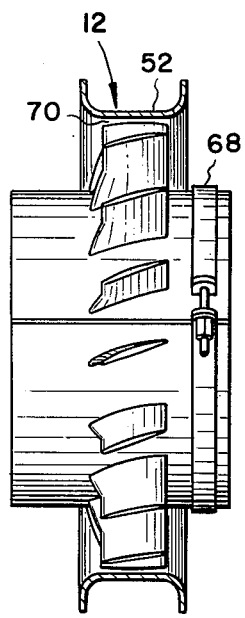
FIG. 9 is a detail axial section of the stator assembly immediately after the step of moving the split ring stator core into the annular channel member 52.
Figure 10:
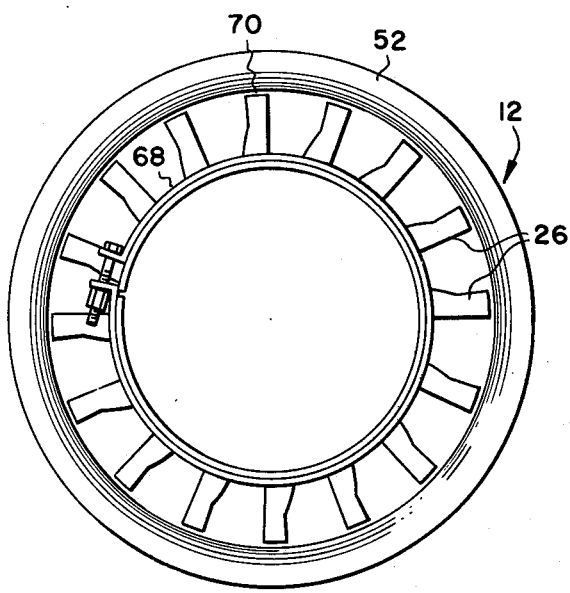
FIG. 10 is a detail end elevation of the same elements shown in FIG. 9 more clearly illustrating the clearance between the radially outer ends of the stator vanes and the annular channel member 52.

After all the vanes have been secured to the split ring 24a, the split ring and vane assembly is inserted axially into the annular channel member 52 of the fan shroud or housing. However the split ring 24a has been formed such that the locus of the vane outer tips is too large in diameter to allow the split ring and vane assembly to be simply inserted into member 52. The split ring 24a is first compressed to partially collapse it to a smaller diameter by one or more compression bands 68 (only one being shown) as shown in FIG. 8. After split ring 24a has been thus reduced in diameter, it is moved axially into the annular stator housing member 52 sufficiently to bring the vanes 26 into axially co-extensive alignment with the stator housing member 52 as shown in FIGS. 9 and 10. This is easily done by reason of the clearance between the vane tips and member 52 as indicated by numeral 70. This clearance is reduced if not eliminated by removing the compression bands 68 and allowing the split ring to expand toward its natural unstressed configuration.

Figure 13:
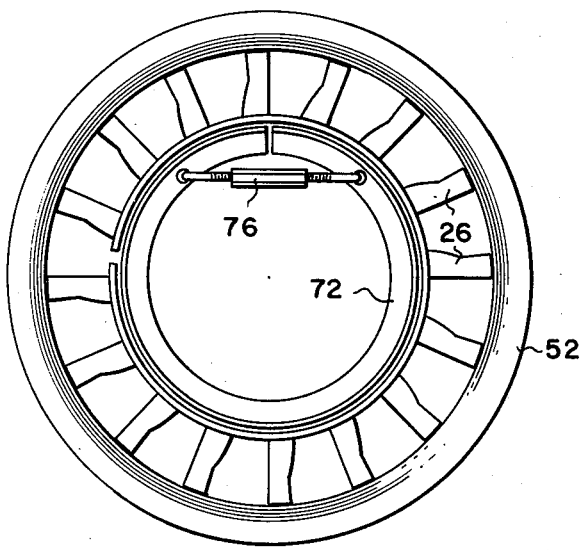
FIG. 13 is an end elevation of the stator assembly under construction illustrating the step of positioning the collapsed or compressed second split ring into the first split ring and the step of releaving constraining faces from the first split ring thereby expanding the first split ring.
Figure 12:
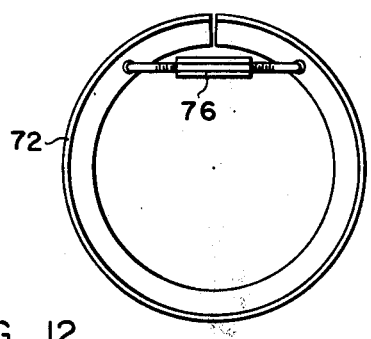
FIG. 12 is a view similar to FIG. 11 illustrating the step of partially collapsing or compressing the second split ring of FIG. 11.
Figure 11:
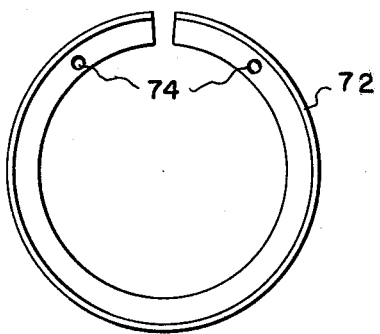
FIG. 11 is an end elevation detail of a second split ring member.

An additional means of expanding split ring 24a is illustrated in FIGS. 11–14. A second split ring 72 in the form of a curved angle bar is provided as shown in FIG. 11. Its outer diameter in unstressed or natural state is larger than the inner diameter of split ring 24a as installed in housing member 52. The web of the second split ring 72 is provided with a through going hole 74 on each side of the split adjacent the ends. A turnbuckle 76 having angled ends is placed in the holes 74 and turned to collapse and thus reduce the diameter of the second split ring 72 so that it may be axially moved into the first split ring 24a as shown in FIG. 13. The turnbuckle is then turned to allow the second split ring to expand inside the first split ring. If desired the turnbuckle may be turned sufficiently to provide a positive force expanding split ring 72 further reducing clearance at the ends of vanes 26.

The split rings 24a and 72 as well as the ends of vanes 26 are welded and the turnbuckle is removed as shown in FIG. 14. The vertical bars of the bearing bracket 30 are then welded directly to the second split ring as illustrated in FIG. 15. The forward portion of the stator core 24 is then welded to the front end of split ring 24a. This completes the stator vane assembly which is then installed as a unit to complete the fan 10 as shown in FIG. 3. As an alternative the forward portion of the stator core 24 may be attached to the split ring 24a after the split ring has been installed in the fan 10.

Although we have described a specific embodiment of our invention, it is contemplated that various changes may be made without departing from the spirit of our invention, and we desire to be limited only by the claims.

We claim:

1. In the method of assembling an axial flow fan, the steps of providing an axially extending generally circular annular stator housing member having a radially inner surface; providing a substantially circular split ring member; providing a plurality of separate stator vanes; attaching said vanes to said split ring member; reducing the diameter of said substantially circular split ring member by applying a constraining force thereto; axially inserting said substantially circular split ring member in axially co-extensive relationship within said stator housing member with said stator vanes radially interposed between said substantially circular split ring member and said inner surface of said stator housing member; subsequently relieving said constraining force to reduce the radial clearance at the ends of said vanes; and welding each of said vanes to said substantially circular split ring member in this position.

2. In the method of assembling an axial flow fan, the steps of: providing an axially extending annular housing member having a radially inner side; providing an axially extending generally circular split ring member having a radially outer side; providing a plurality of separate stator vanes; fastening said vanes to one of said inner and outer sides; axially passing said generally circular split ring member into said annular housing member; subsequently expanding said generally circular split ring member radially outwardly thereby reducing the radial clearance at at least one end of stator vanes; and welding each of said vanes to one of said substantially circular split ring member and said annular housing member in this position.

3. The method of claim 2 wherein said step of fastening said vanes is via fastening said vanes to said outer side of said axially extending generally circular split ring member.

4. The method of claim 2 further including prior to said passing step, the step of constraining said generally circular split ring member radially inwardly to reduce its diameter and wherein said expanding step is via discontinuing said constraining step.

5. The method of claim 2 further including the step of providing a second split ring member; constraining said second split ring member radially inwardly; passing said constrained second split ring member into said axially extending generally circular split ring member; and said expanding step includes the step of relieving the constraining force on said second split ring member so that said second split ring member expands radially outwardly against said first generally circular split ring member.

6. The method of claim 5 wherein said step of fastening said vanes is via fastening said vanes to said outer side of said axially extending generally circular split ring member.

7. A method of constructing an axial flow fan including the steps of: providing a generally circular split ring stator core; providing a plurality of separate stator vanes; positioning said stator vanes in radially outwardly extending positions at circumferentially spaced locations about said generally circular split ring stator core; securing said vanes at one end to said generally circular split ring stator core to form a split ring stator core-vane assembly; providing a generally circular annular fan shroud housing; decreasing the radius of curvature of said generally circular split ring stator core sufficiently to permit said generally circular split ring stator core-vane assembly to be passed into axially co-extensive relationship within said fan shroud housing; axially passing said split ring stator core-vane assembly into axially co-extensive relationship within said fan shroud housing; subsequent to said passing step, reducing the clearance between the radially outward end of said vanes and said fan shroud housing by expanding said split ring stator core; securing said split ring stator core in said expanded position; and welding the radial outer ends of each of said vanes to said fan shroud housing.

* * * * *